US012704174B2

(12) United States Patent
Weston et al.

(10) Patent No.: US 12,704,174 B2
(45) Date of Patent: Aug. 11, 2026

(54) SYSTEMS AND METHODS TO IMPEDE SHIFT FROM PARK IN A VEHICLE

(71) Applicant: Ford Global Technologies, LLC, Dearborn, MI (US)

(72) Inventors: Keith Weston, Canton, MI (US); John Robert Van Wiemeersch, Novi, MI (US); Stuart C. Salter, White Lake, MI (US); Brendan Diamond, Naples, FL (US)

( * ) Notice: Subject to any disclaimer, the term of this patent is extended or adjusted under 35 U.S.C. 154(b) by 0 days.

(21) Appl. No.: 18/951,432

(22) Filed: Nov. 18, 2024

(65) Prior Publication Data

US 2026/0139736 A1 May 21, 2026

(51) Int. Cl.
*B60W 10/10* (2012.01)
*F16H 59/50* (2006.01)
(Continued)

(52) U.S. Cl.
CPC ............ *F16H 61/16* (2013.01); *F16H 59/50* (2013.01); *B60W 10/10* (2013.01);
(Continued)

(58) Field of Classification Search
CPC .... F16H 61/16; F16H 2061/223; F16H 61/18; F16H 59/50; B60W 10/10; B60W 50/12;
(Continued)

(56) References Cited

U.S. PATENT DOCUMENTS 6,154,658 A 11/2000 Caci
9,283,931 B2 3/2016 Skelton
(Continued)

FOREIGN PATENT DOCUMENTS

WO 2019014565 A1 1/2019
WO 2024018448 A2 1/2024

OTHER PUBLICATIONS

Anshul Saxena, Everything You Need to Know About in-Vehicle Infotainment Systems, https://www.einfochips.com/blog/everything-you-need-to-know-about-in-vehicle-infotainment-system/, May 30, 2024, pp. 1-17.
(Continued)

*Primary Examiner* — Roger L Pang
(74) *Attorney, Agent, or Firm* — Frank Lollo; Eversheds Sutherland (US) LLP

(57) ABSTRACT

A vehicle including a sensor unit and a processor is disclosed. The sensor unit may detect a presence of a user and predetermined items in the vehicle. The processor may determine that the user has entered the vehicle based on inputs obtained from the sensor unit. Responsive to determining that the user has entered the vehicle, the processor may determine that a predefined condition is met based on the inputs obtained from the sensor unit. The processor may determine that the predefined condition is met when one or more first items present in the vehicle do not match a user's predefined authorized item list or one or more second items that are preferred by the user are absent from the vehicle. The processor may further disable the vehicle from being shifted out of a park mode responsive to determining that the predefined condition is met.

20 Claims, 5 Drawing Sheets

(51) Int. Cl.
*F16H 61/16* (2006.01)
*F16H 61/22* (2006.01)

(52) U.S. Cl.
CPC ..... *B60W 2530/18* (2013.01); *B60W 2540/01* (2020.02); *B60W 2540/043* (2020.02); *B60W 2540/045* (2020.02); *B60W 2554/80* (2020.02); *B60W 2556/10* (2020.02); *B60W 2710/1005* (2013.01); *F16H 2061/223* (2013.01)

(58) Field of Classification Search
CPC ..... B60W 2710/1005; B60W 2556/10; B60W 2554/80; B60W 2540/043; B60W 2540/045; B60W 2530/18; B60W 2540/01
USPC ........................................................ 701/51, 57
See application file for complete search history.

(56) References Cited

U.S. PATENT DOCUMENTS

| | | | |
|---|---|---|---|
| 10,507,868 | B2 | 12/2019 | Lavoie et al. |
| 10,769,930 | B2 * | 9/2020 | Sasaki ..................... H04W 4/48 |
| 12,115,930 | B1 * | 10/2024 | Glover .................. B60R 25/007 |
| 2006/0026017 | A1 | 2/2006 | Walker |
| 2007/0079012 | A1 | 4/2007 | Walker |
| 2013/0274957 | A1 | 10/2013 | Miller et al. |
| 2015/0161832 | A1 | 6/2015 | Esselink et al. |
| 2017/0200197 | A1 | 7/2017 | Brubaker |
| 2018/0091930 | A1 | 3/2018 | Jefferies |
| 2018/0297555 | A1 * | 10/2018 | Simon .................... B62D 5/001 |
| 2018/0319402 | A1 | 11/2018 | Mills |
| 2020/0322476 | A1 | 10/2020 | Cohen et al. |
| 2022/0405691 | A1 | 12/2022 | Nilmeier et al. |
| 2024/0179072 | A9 | 5/2024 | Ricci et al. |
| 2024/0246511 | A1 * | 7/2024 | Jiang ....................... B60R 25/24 |

OTHER PUBLICATIONS

Thomas M. Kowalick, Fatal Exit: The Automotive Black Box Debate, IEEE Xplore, https://ieeexplore.ieee.org/book/5201877, 2004, Abstract.
Thomas M. Kowalick, “Legal and Privacy Issues: 1999-2004”, in Fatal Exit: The Automotive Black Box Debate, https://ieeexplore.ieee.org/document/5238270, 2004, Abstract.
Thomas M. Kowalick, “Pros and Cons and Customers of Safety Data and NHTSA Rulemaking”, in Fatal Exit: The Automotive Black Box Debate, IEEE Xplore, https://ieeexplore.ieee.org/document/5238271, 2004, Abstract.
IEEE Standard for Motor Vehicle Event Data Recorder (MVEDR)—Redline, in IEEE Std 1616-2021 (Revision of IEEE Std 1616-2004)—Redline, https://ieeexplore.ieee.org/document/9760253, Dec. 17, 2021, Abstract.
Venkat Sumantran, et al., Innovations to Stay “Always Connected”, in Faster, Smarter, Greener: The Future of the Car and Urban Mobility , MIT Press, https://ieeexplore.ieee.org/document/8093905, 2017, Abstract.
Venkat Sumantran, et al., “Innovations in Marketplaces”, in Faster, Smarter, Greener: The Future of the Car and Urban Mobility, MIT Press, 2017, https://ieeexplore.ieee.org/document/8093902, Abstract.
Dominique Paret, et al., Autonomous and Connected Vehicles: Network, Architectures from Legacy Networks to Automotive Ethernet, IEEE, https://ieeexplore.ieee.org/servlet/opac?bknumber=9770851, 2022, Abstract.
IEEE Draft Standard for Motor Vehicle Event Data Recorder (MVEDR), IEEE, Jan. 2010, Abstract.
Stephan Olariu, et al., The Next Paradigm Shift: From Vehicular Networks to Vehicular Clouds, https://doi.org/10.1002/9781118511305.ch19, Feb. 22, 2013. Abstract.
Joshua E. Siegel, et al., Surveying Off-Board and Extra Vehicular Monitoring and Progress Towards Pervasive Diagnostics, https://arxiv.org/pdf/2007.03759, Mar. 3, 2021, pp. 1-25.
iPhone User Guide, Set separation alerts in case your leave an AirTag or item behind in Find My on iPhone, https://support.apple.com/guide/iphone/get-notified-if-you-leave-an-item-behind-iph5fe280d90/ios, 2024, pp. 1-2.

* cited by examiner

SYSTEMS AND METHODS TO IMPEDE SHIFT FROM PARK IN A VEHICLE

FIELD

The present disclosure relates to systems and methods to impede a vehicle shift from park mode when one or more predefined conditions are met.

BACKGROUND

For most people, electronic devices such as phones, laptops, tablets, smartwatches, etc. are essential items that they require in their daily personal and/or work-related activities. People may face inconvenience when they leave their homes or offices via their vehicles and forget to carry one or more of these devices with them. In a similar manner, people may face inconvenience when they drive their vehicles without checking the vehicle's key parameters and/or operating condition.

Furthermore, with the gaining popularity of autonomous vehicles (AVs), many users prefer to commute via AVs. AV users may face inconvenience when an AV (e.g., an autonomous taxi) automatically moves and all the desired occupants are not present in the AV.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
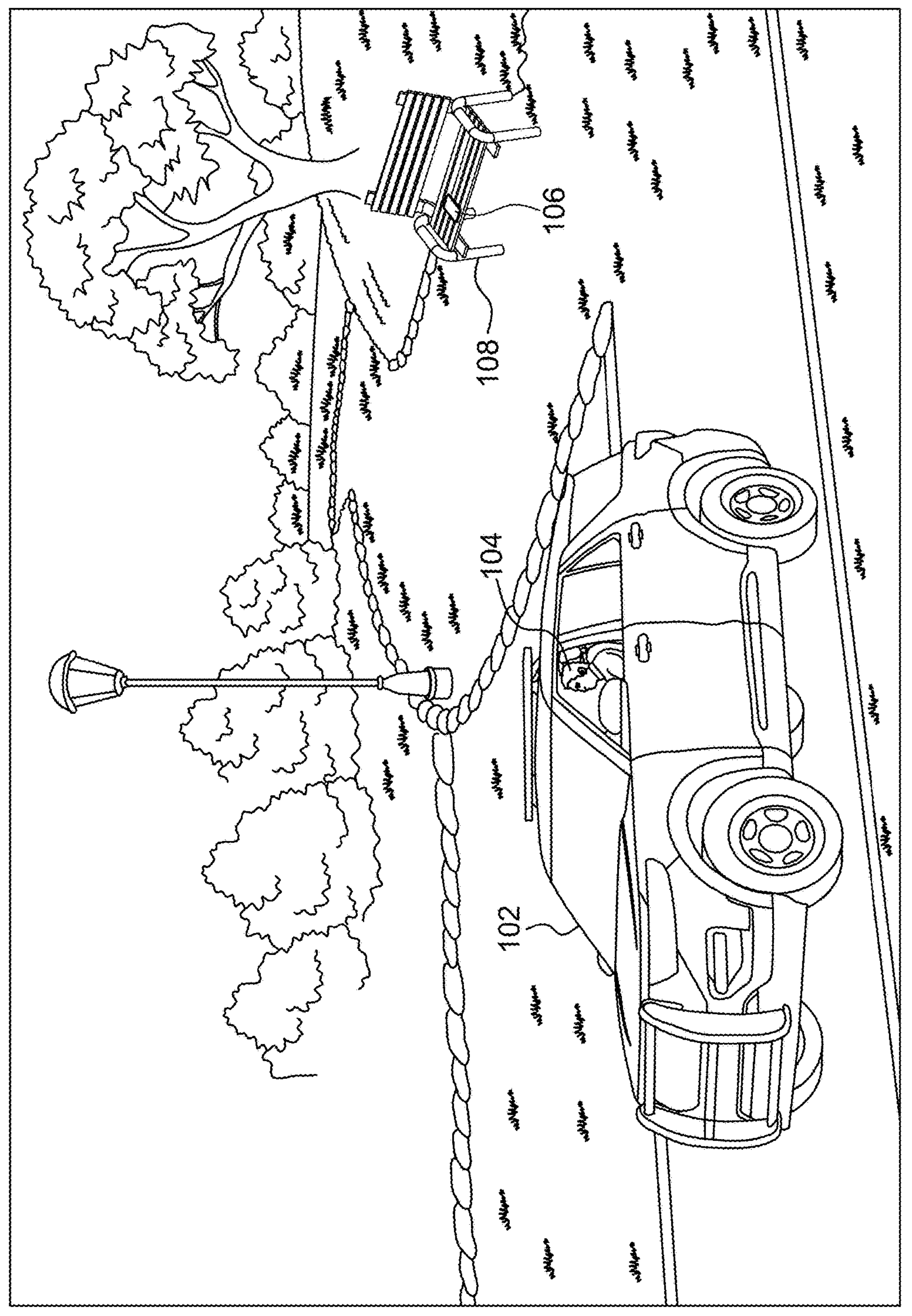
FIG. 1 depicts an environment in which techniques and structures for providing the systems and methods disclosed herein may be implemented.

The present disclosure describes a vehicle that may impede a shift from park mode when a vehicle user may have forgotten to bring one or more predefined items in the vehicle, or when one or more predefined items should not be present in the vehicle, or when one or more key vehicle parameters may not be in an optimal condition. For example, the vehicle may impede the shift from park mode when the user forgets to bring the user's phone, smartwatch, lunch, gym bag, etc. in the vehicle, and the user attempts to drive the vehicle. As another example, the vehicle may impede the shift from park mode when a vehicle's door may be open, one or more vehicle occupants may not be buckled to their respective sitting areas, a vehicle tire pressure may be less than a predefined threshold value, and/or the like, and the user attempts to drive the vehicle. As yet another example, the vehicle may impede the shift from park mode when someone else's item (e.g., a gun or medicines) not belonging to the user may be present in the vehicle, and the user attempts to drive the vehicle.

In some aspects, the user or a fleet manager may configure or "define" in the vehicle the different types of items that the vehicle should check for their absence every time the user enters the vehicle and attempts to drive the vehicle. For example, the user or the fleet manager may define that the vehicle should check for the absence of user's phone and smartwatch whenever the user enters the vehicle and attempts to drive the vehicle. In this case, the vehicle may check for the absence of user's phone and smartwatch whenever the user enters the vehicle and attempts to drive the vehicle and may impede the user from shifting the vehicle out of park mode if the vehicle is not able to detect these devices in the vehicle. In some aspects, the vehicle may detect the presence of such devices in the vehicle based on inputs obtained from a vehicle sensor unit. Whenever the vehicle is not able to detect the presence of such devices in the vehicle based on the inputs obtained from the sensor unit, the vehicle may determine that the user may have forgotten to bring these devices with the user.

In further aspects, the user or the fleet manager may configure or define in the vehicle the types of items that the vehicle should check for their absence only when the user is traveling (or is expected to travel) to specific predefined locations. For example, the user or the fleet manager may define that the vehicle should check for the absence of user's gym bag when the user is expected to travel to a gym (and not otherwise). In this case, whenever the vehicle determines that the user is expected to travel to the gym (e.g., based on user's historical travel pattern or a programmed navigation route), the vehicle may check for the gym bag presence in the vehicle when the user enters the vehicle and attempts to drive it. In this case, the vehicle may impede the vehicle's shift from park mode when the vehicle is not able to detect the gym bag presence in the vehicle.

In additional aspects, the user or the fleet manager may configure or define in the vehicle the different types of items that the vehicle should check for their presence every time the user enters the vehicle and attempts to drive the vehicle. For example, the user or the fleet manager may define that the vehicle should check for the presence of someone else's items (e.g., someone else's medicines, gun, etc.) whenever the user enters the vehicle and attempts to drive the vehicle. In this case, the vehicle may check for the presence of someone else's items in the vehicle whenever the user enters the vehicle and attempts to drive the vehicle and may impede the user from shifting the vehicle out of park mode if the vehicle detects such items in the vehicle.

In further aspects, the vehicle may impede the shift from park when one or more items (e.g., items "approved" by the user) are present in the vehicle on a leg of a trip that should not be present in the vehicle. For example, the vehicle may impede the shift from park when the user stops the vehicle to drop the user's kid to daycare but the diaper bag is still present in the vehicle when the user attempts to drive the vehicle again. As another example, the vehicle may impede the shift from park when the user stops the vehicle to drop the user's kid to school but the school backpack is still present in the vehicle when the user attempts to drive the vehicle again. As yet another example, the vehicle may impede the shift from park when the user attempts to drive the vehicle from the school towards the user's office and the user's briefcase is absent from the vehicle.

In further aspects, the vehicle may impede the shift from park when one or more conditions associated with vehicle parameters or operation are met. For example, the vehicle may impede the shift from park when a vehicle tire pressure may be less than a predefined threshold value, one or more vehicle doors may be open, one or more vehicle occupants may not be not buckled, one or more predefined vehicle lights may be switched off, one or more objects may be disposed unsecured on a vehicle top portion, one or more objects may be disposed in proximity to a vehicle front portion or a vehicle rear portion, the user may not be wearing a predefined uniform, a predefined object may be placed on a vehicle dash, and/or the like.

In additional aspect, the vehicle may impede the shift from park when the user attempts to drive the vehicle without completing the vehicle inspection. In some aspects, the vehicle inspection may include an inspection of a vehicle exterior portion, an inspection of a vehicle interior portion, an inspection of a vehicle-trailer connection, an inspection of vehicle occupants, and/or the like.

Furthermore, the vehicle may enable the user or the fleet manager to define one or more override actions that the user may perform to override the vehicle's "impede from park" feature described above. For example, the user may define that the vehicle should enable the vehicle's shift from park mode when the user tries to shift the vehicle from park mode in a second attempt. As another example, the user may define that the vehicle should enable the vehicle's shift from park mode when the user provides an override input (e.g., a predefined gesture, audio command, confirmation via a vehicle Human-Machine Interface, etc.) to the vehicle.

The present disclosure discloses a vehicle that that may impede shift from park when the user may have forgotten to bring one or more predefined items in the vehicle or one or more key vehicle parameters may not be in an optimal condition. In this manner, the vehicle may ensure that the user does not leave important items in the user's home, office, etc. when the user drives the vehicle. The vehicle may further ensure that the vehicle is not in a suboptimal condition when the user drives the vehicle. The vehicle may further enable the user to override the vehicle's "impede from park" feature, so that the user may still drive the vehicle even when the predefined items may be absent from the vehicle (e.g., when the user may be fine leaving the user's home, office, etc. without these items and/or when the user may be in a rush).

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain, such as a gasoline engine or a hybrid system.

In some aspects, the vehicle 102 may impede a vehicle's shift from park mode or prevent a vehicle driver (e.g., a user 104) from shifting the vehicle's gear selector out of park when one or more predefined conditions may be met. For example, the vehicle 102 may impede the vehicle's shift from park mode when one or more first items present in the vehicle 102 do not match a user's predefined authorized item list or one or more second items that are preferred by the user 104 are absent from the vehicle 102 when the user 104 attempts to drive the vehicle 102. In one exemplary aspect, the vehicle 102 may impede the vehicle shift from park mode when the user 104 does not bring a user device 106 (as an example of the "second item" described above) associated with the user 104 in the vehicle 102 when the user 104 attempts to shift the vehicle 102 from park mode. For example, the vehicle 102 may impede the vehicle shift from park mode when the user 104 forgets the user device 106 on a bench 108 (or user's home, office, etc.) and attempts to drive the vehicle 102. In this case, the user device 106 may be pre-synced or registered with the vehicle 102, and the vehicle 102 may determine that the user 104 may have forgotten the user device 106 when the user 104 enters the vehicle 102 and the vehicle's Bluetooth Low Energy (BLE) transceiver or Phone-as-a-key transceiver is not able to communicatively couple with the user device 106 (indicating that the user device 106 is not within a predefined range of the vehicle 102). Responsive to such determination, the vehicle 102 may disable or prevent the user 104 from shifting the vehicle 102 out of park mode, and hence prevent the user 104 from driving the vehicle 102. In this case, the vehicle 102 may additionally output a visual and/or audible notification via a vehicle Human-Machine Interface (HMI) indicating that the user 104 may have forgotten the user device 106. In this manner, the vehicle 102 may prevent the user 104 from driving the vehicle 102 without carrying their essential items, e.g., the user device 106.

The user device 106 may be, for example, a mobile phone, a laptop, a computer, a tablet, a smartwatch, a device with an Ultra-Wideband (UWB) or a near-field communication (NFC) tag, or any other communication device that the user 104 may have pre-synced or registered with the vehicle 102. In some aspects, the user 104 (or a vehicle fleet manager if the vehicle 102 is part of a vehicle fleet) may pre-configure in the vehicle 102 one or more user devices that the vehicle 102 should check for their absence before the vehicle 102 enables the vehicle shift from park mode. For example, the user 104 may configure that the vehicle 102 should check for the absence of the user's mobile phone and smartwatch in the vehicle 102 when the user 104 enters the vehicle 102 but is not required to check for the absence of the user's laptop. In this case, the vehicle 102 may disable the vehicle shift from park mode when the user 104 enters the vehicle 102 without the user's mobile phone and/or smartwatch; however, the vehicle 102 may enable the vehicle shift from park mode when the user 104 enters the vehicle 102 without the user's laptop.

The present disclosure is not limited to the vehicle 102 checking for the absence of only the user devices that are pre-synced with the vehicle 102 as described above. In additional aspects, the user 104 may configure that the vehicle 102 should check for the absence of user's other predefined belongings (as additional examples of the "second items" described above) such as lunch, jacket, gym bag, and/or other items when the user 104 enters the vehicle 102, and should impede the vehicle shift from park mode when the user 104 enters the vehicle 102 without any of these items. In this case, the vehicle 102 may check for the absence of these items in the vehicle 102 when the user 104 enters the vehicle 102 via one or more of the vehicle's interior cameras, sensors, etc. Specifically, when the vehicle's interior cameras, sensors, etc. are not able to detect the presence of these items in the vehicle 102 when the user 104 enters the vehicle 102, the vehicle 102 may determine that the user 104 may have forgotten to bring these items along, and may hence impede the vehicle shift from park mode in such cases.

It may be appreciated that there may be scenarios where the user 104 may desire to drive the vehicle 102 even when the user 104 enters the vehicle 102 without the devices/items described above. To enable the user 104 to shift the vehicle 102 out of park mode in such scenarios, the vehicle 102 may provide one or more override features. In this case, the user 104 may "define" or configure different types of override features for different types of devices/items that the vehicle 102 is required to check for their absence.

For example, the user 104 may configure the vehicle 102 such that if the user 104 forgets to bring a first predefined type of item in the vehicle 102, the user 104 may override the vehicle's "impede from park" feature when the user 104 attempts to shift the vehicle 102 out of park mode in a second attempt. Examples of such first predefined type of items may include user's lunch, jacket, gym bag, etc. In this case, the vehicle 102 may impede the shift from park when the user 104 forgets to bring the first predefined type of item in the vehicle 102 and attempts to shift the vehicle 102 from park mode in a first attempt. Further, in this case, the vehicle 102 may enable the user 104 to shift the vehicle 102 from park when the user 104 attempts to shift the vehicle 102 from the park mode in a second attempt.

As another example, the user 104 may configure the vehicle 102 such that if the user 104 forgets to bring a second predefined type of item in the vehicle 102, the user 104 may override the vehicle's "impede from park" feature when the user 104 provides an override input to the vehicle via the vehicle's HMI, an audio command, a gesture command, and/or the like. Examples of such second predefined type of items may include the user's mobile phone, smartwatch, etc. In this case, the vehicle 102 may impede the shift from park when the user 104 forgets to bring the second type of item in the vehicle 102 and may enable the user 104 to shift the vehicle 102 from the park mode when user 104 provides the override input to the vehicle 102.

Although the description above describes an aspect where the vehicle 102 impedes the shift from park when one or more devices/items are absent from the vehicle 102 when the user 104 enters the vehicle 102, the present disclosure is not limited to such an aspect. In additional aspects, the vehicle 102 may impede the shift from park when one or more other types of items (e.g., the "first items" described above) are present in the vehicle 102 when the user 104 attempts to shift the vehicle 102 out of park mode. For example, the vehicle 102 may impede the shift from park when one or more items not belonging to the user 104 (e.g., someone else's medicines, gun, etc. (i.e., those items that are not part of the user's predefined authorized item list)) may be present in the vehicle 102 when the user 104 attempts to shift the vehicle 102 out of park mode. In this case, the vehicle 102 may be a fleet vehicle, a taxi, a public transport vehicle, a police vehicle, an ambulance, and/or the like, where probability of users leaving their items behind is high. Further, in this case, the user 104 (or the fleet manager) may configure the types of items (e.g., a third predefined type of items) that the vehicle 102 should check for their presence in the vehicle 102 when the user 104 attempts to shift the vehicle 102 out of park mode and their corresponding override feature(s). For example, the user 104 may configure the vehicle 102 such that whenever someone else's gun or ammunition is present in the vehicle 102 when the user 104 enters the vehicle 102, the vehicle 102 should impede the shift from park mode (in this case, the vehicle 102 may be a police car). As another example, the vehicle 102 may impede the shift from park mode when the user's gun may be present in the vehicle 102 and someone else (e.g., the user's family member) attempts to drive the vehicle 102 when the user 104 is not present in the vehicle 102. Further, the user 104 may configure the vehicle 102 such that the user 104 may override the "impede from park" feature in such cases by providing a predefined gesture or a hand wave towards the vehicle HMI. In an exemplary aspect, in this case, the vehicle 102 may determine the presence of someone else's gun or ammunition in the vehicle 102 based on the inputs obtained from the vehicle's interior cameras, sensors, etc.

In further aspects, the vehicle 102 may enable the user 104 to extend the "impede from park" feature to other scenarios beyond the checking of presence or absence of predefined items as described above. For example, in some aspects, the user 104 may configure the vehicle 102 such that the vehicle 102 may impede the shift from park mode when one or more conditions associated with vehicle parameters are met. In this case, in an exemplary aspect, the vehicle 102 may impede the shift from park mode when a vehicle tire pressure is less than a predefined threshold value, one or more vehicle doors are open when the user 104 attempts to shift the vehicle 102 out of park mode, one or more vehicle occupants and/or the user 104 are not buckled to their respective sitting areas, one or more predefined vehicle lights are switched off (e.g., when the user 104 or the fleet manager requires one or more vehicle lights to be switched on during vehicle movement), one or more objects are disposed unsecured on a vehicle top portion, one or more objects are disposed in proximity to a vehicle front portion or a vehicle rear portion, the user 104 is not wearing a predefined uniform (e.g., when the user 104 is required to wear a predefined uniform while driving the vehicle 102), a predefined object (e.g., sunglasses or a reflective object) is placed on a vehicle dash, and/or the like.

In a similar manner as described above, the user 104 may additionally configure that the user 104 may override the "impede from park" feature in such cases by providing a predefined override input to the vehicle 102 and/or trying to shift the vehicle 102 out of park mode in a second or third attempt.

As another example, the user 104 may configure the vehicle 102 such that the vehicle 102 may impede the shift from park mode when the user 104 does not complete the vehicle's interior and/or exterior inspection before attempting to shift the vehicle 102 out of park mode. In this case, the vehicle 102 may be a fleet vehicle, a taxi, a public transport vehicle, a police vehicle, and/or the like, which may require the user 104 to inspect the vehicle 102 before driving the vehicle 102. The vehicle 102 may determine whether the user 104 has completed the vehicle inspection based on the inputs obtained from the vehicle's interior and/or exterior cameras, sensors, etc. Furthermore, in a similar manner as described above, the user 104 may additionally configure that the user 104 may override the "impede from park" feature when the user 104 has not completed the vehicle inspection by providing one or more predefined override inputs to the vehicle 102.

Further vehicle 102 details are described below in conjunction with FIG. 2.

The vehicle 102 implements and/or performs operations, as described here in the present disclosure, in accordance with the owner manual and safety guidelines. In addition, any action taken by the user 104 based on the notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

Figure 2:
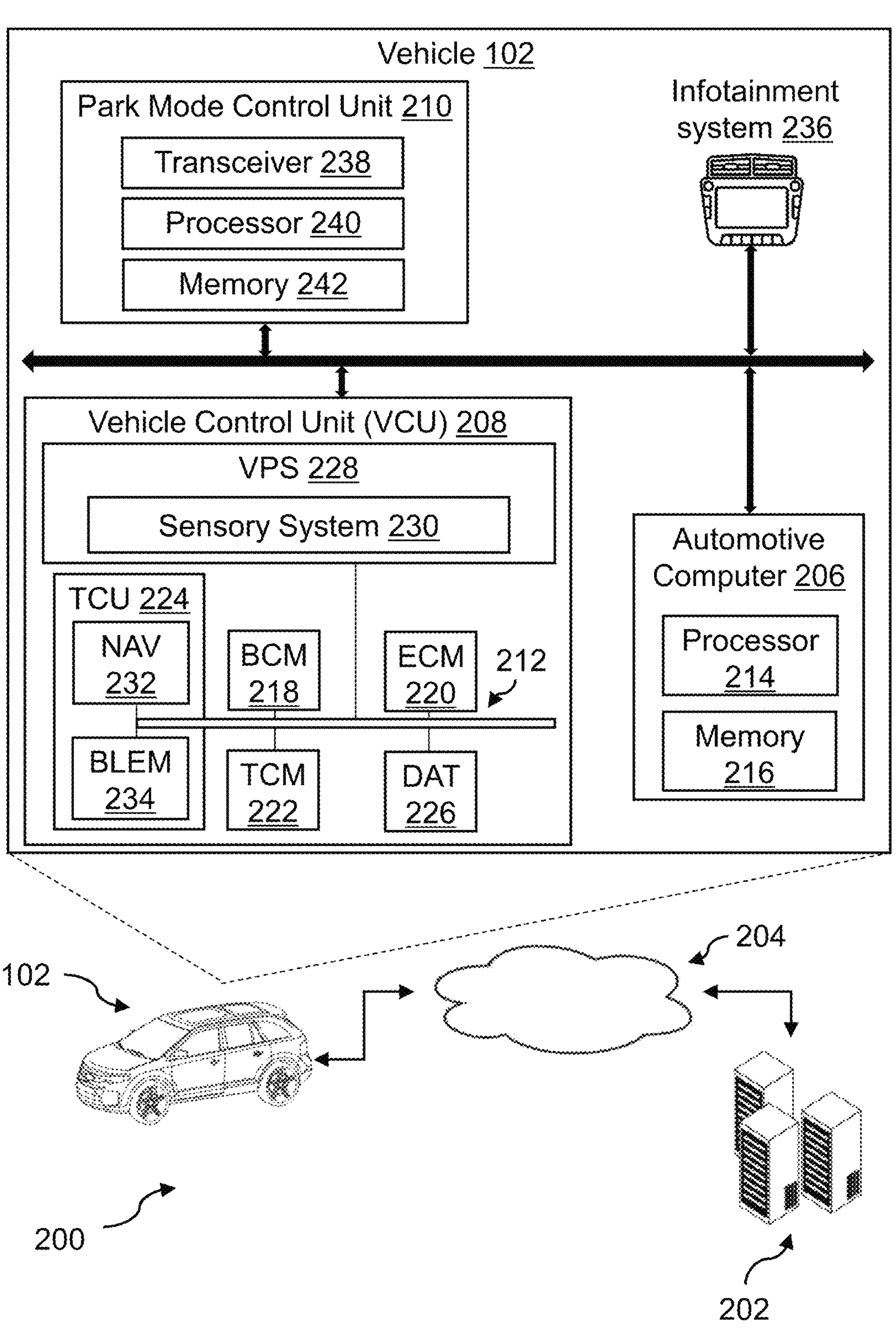
FIG. 2 depicts a block diagram of a system to impede a vehicle shift from park mode in accordance with the present disclosure.

FIG. 2 depicts a block diagram of a system 200 to impede a vehicle shift from park mode in accordance with the present disclosure. While describing FIG. 2, references will be made to FIGS. 3 and 4.

The system 200 may include the vehicle 102 and one or more servers 202 (or a server 202) that may be communicatively coupled with each other via one or more networks 204. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 202 may store information associated with historical vehicle travel pattern and/or the travel pattern of the user 104 (or the user's historical travel pattern). The server 202 may transmit the information associated with the historical vehicle travel pattern and/or the user's historical travel pattern to the vehicle 102 when the vehicle 102 transmits a request to the server 202 to receive such information.

The network(s) 204 illustrates an example communication infrastructure in which the connected devices discussed in various embodiments of this disclosure may communicate. The network(s) 204 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 206, a Vehicle Control Unit (VCU) 208 and a park mode control unit 210 (or unit 210). The VCU 208 may include a plurality of Electronic Control Units (ECUs) 212 in communication with the automotive computer 206.

In some aspects, the automotive computer 206 and/or the unit 210 may be installed anywhere in the vehicle 102, in accordance with the disclosure. Further, the automotive computer 206 may operate as a functional part of the unit 210. The automotive computer 206 may be or include an electronic vehicle controller, having one or more processor(s) 214 and a memory 216. Moreover, the unit 210 may be separate from the automotive computer 206 (as shown in FIG. 2) or may be integrated as part of the automotive computer 206.

The processor(s) 214 may be in communication with one or more memory devices in communication with the respective computing systems (e.g., the memory 216 and/or one or more external databases not shown in FIG. 2). The processor(s) 214 may utilize the memory 216 to store programs in code and/or to store data for performing aspects in accordance with the disclosure. The memory 216 may be a non-transitory computer-readable medium or memory storing a park mode control program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 208 may share a power bus with the automotive computer 206 and may be configured and/or programmed to coordinate the data between vehicle 102 systems, connected servers (e.g., the server(s) 202), and other vehicles (not shown in FIG. 2) operating as part of a vehicle fleet. The VCU 208 may include or communicate with any combination of the ECUs 212, such as a Body Control Module (BCM) 218, an Engine Control Module (ECM) 220, a Transmission Control Module (TCM) 222, a Telematics Control Unit (TCU) 224, a Driver Assistances Technologies (DAT) controller 226, etc.

The VCU 208 may further include and/or communicate with a Vehicle Perception System (VPS) 228, having connectivity with and/or control of one or more vehicle sensory system(s) 230 (or a "sensor unit"). The vehicle sensory system 230 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, ambient light sensors, vehicle internal and external cameras, one or more rain sensors, a humidity sensor, a tire pressure sensor, ultrasonic sensors, etc. In some aspects, the vehicle sensory system 230 may detect presence of one or more users/occupants (e.g., the user 104) and one or more predetermined items (e.g., lunch, jacket, gym bag, gun, medicines, sunglasses, etc.) in the vehicle 102 based on inputs captured by the sensors described above. For example, the vehicle sensory system 230 may detect the presence of the user 104 in the vehicle 102 based on the inputs captured by the vehicle internal and/or external cameras, radar and/or lidar sensors, sitting area sensors, and/or the like. Similarly, the vehicle sensory system 230 may detect the presence of the predetermined items in the vehicle 102 based on the inputs captured by the vehicle internal and/or external cameras, radar and/or lidar sensors, etc.

In some aspects, the VCU 208 may control vehicle operational aspects and implement one or more instruction sets received from the user device(s) associated with the user 104, from one or more instruction sets stored in the memory 216, including instructions operational as part of the unit 210.

The TCU 224 may be configured and/or programmed to provide vehicle connectivity to wireless computing systems onboard and off board the vehicle 102 and may include a Navigation (NAV) receiver 232 for receiving and processing a GPS signal, a BLE Module (BLEM) 234, a Wi-Fi transceiver, a UWB transceiver, and/or other wireless transceivers (not shown in FIG. 2) that may be configurable for wireless communication (including cellular communication) between the vehicle 102 and other systems (e.g., the user device 106, a key fob, an NFC device, etc.), computers, and modules. The NAV receiver 232 may be configured to determine a real-time vehicle geolocation. The TCU 224 may be in communication with the ECUs 212 by way of a bus.

In some aspects, the vehicle 102 may further include one or more BLE transceivers, Phone-as-a-key transceivers, and/or other similar transceivers, which may be part of the vehicle's sensor unit and may enable the vehicle 102 to determine if one or more user devices pre-synced or registered with the vehicle 102 are within a predefined range of the vehicle 102. Specifically, the transceivers described above may automatically couple with the pre-synced user devices via BLE, UWB, NFC, etc. when the user devices may be within a predefined range of the vehicle 102, indicating to the vehicle 102 that these user devices are in proximity to the vehicle 102 or in the vehicle interior portion. Consequently, when the user 104 enters the vehicle 102, the vehicle 102 may check inputs from these transceivers to determine whether the pre-synced user devices are with the user 104 or the user 104 may have forgotten to bring these user devices. In some aspects, the vehicle 102 may determine that the pre-synced user devices are not with the user 104 when the inputs from the transceivers indicate that the transceivers are not communicatively coupled with these devices. As described above, the vehicle 102 may impede the user 104 from shifting the vehicle 102 out of park mode when the vehicle 102 determines that the user 104 has entered the vehicle 102 without carrying one or more pre-synced user devices. In a similar manner, the vehicle 102 may determine that the pre-synced user devices are with the user 104 when the inputs from the transceivers indicate that the transceivers are communicatively coupled with these devices. The vehicle 102 may not impede the user 104 from shifting the vehicle 102 out of park mode in this case.

The ECUs 212 may control aspects of vehicle operation and communication using inputs from human drivers, inputs from an autonomous vehicle controller, the unit 210, and/or via wireless signal inputs received via the wireless connection(s) from other connected devices, such as the user device(s) associated with the user 104, the server(s) 202, among others.

The BCM 218 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), gear selector, speakers, wipers, door locks and access control, mirrors, various comfort controls, enclosures, and/or the like. The BCM 218 may also operate as a gateway for bus and network interfaces to interact with remote ECUs (not shown in FIG. 2).

The DAT controller 226 may provide Level-1 through Level-3 automated driving and driver assistance functionality that may include, for example, active parking assistance, vehicle backup assistance, and adaptive cruise control, among other features. The DAT controller 226 may also provide aspects of user and environmental inputs usable for user authentication.

In some aspects, the automotive computer 206 may connect with an infotainment system 236 (or a vehicle Human-Machine Interface (HMI) 236). The infotainment system 236 may include a touchscreen interface portion and may include voice recognition features, biometric identification capabilities that can identify users based on facial recognition, voice recognition, fingerprint identification, or other biological identification means. In other aspects, the infotainment system 236 may further receive user instructions/inputs via the touchscreen interface portion and/or display notifications/recommendations, navigation maps, etc. on the touchscreen interface portion.

The computing system architecture of the automotive computer 206, the VCU 208, and/or the unit 210 may omit certain computing modules. It should be readily understood that the computing environment depicted in FIG. 2 is an example of a possible implementation according to the present disclosure, and thus, it should not be considered limiting or exclusive.

In accordance with some aspects, the unit 210 may be integrated with and/or executed as part of the ECUs 212. The unit 210, regardless of whether it is integrated with the automotive computer 206 or the ECUs 212, or whether it operates as an independent computing system in the vehicle 102, may include a transceiver 238, a processor 240, and a computer-readable memory 242.

The transceiver 238 may receive information/inputs from one or more external devices or systems, e.g., the user device 106 or other user devices associated with the user 104, the server(s) 202, and/or the like via the network 204. For example, the transceiver 238 may receive the information associated with the historical vehicle travel pattern and/or the user's historical travel pattern from the server 202 via the network 204. Further, the transceiver 238 may transmit notifications to the external devices or systems. In addition, the transceiver 238 may receive information/inputs from vehicle 102 components such as the infotainment system 236, the VCU 208, and/or the like. Further, the transceiver 238 may transmit notifications/command signals to the vehicle 102 components such as the VCU 208, the infotainment system 236, the BCM 218, etc.

The processor 240 and the memory 242 may be the same as or similar to the processor 214 and the memory 216, respectively. In some aspects, the processor 240 may utilize the memory 242 to store programs in code and/or to store data for performing aspects in accordance with the disclosure. The memory 242 may be a non-transitory computer-readable medium or memory storing the park mode control program code. In some aspects, the memory 242 may store the information associated with the historical vehicle travel pattern and/or the user's historical travel pattern described above.

In further aspects, the memory 242 may store a data structure that includes information associated with different types of items/devices whose presence or absence the vehicle 102 should check when the user 104 attempts to shift the vehicle 102 from park mode, and accordingly disable or enable the vehicle's shift from the park mode. The data structure may further include information associated with one or more override actions that the user 104 may need to perform to override the vehicle's "impede from park" feature. The data structure may further include information associated with one or more vehicle parameters that the vehicle 102 should check before enabling the vehicle's shift from the park mode and whether the vehicle 102 should check for the completion of vehicle inspection before enabling the vehicle's shift from the park mode. In some aspects, the user 104 and/or a fleet manager may configure/set and/or adjust the information included in the data structure via the infotainment system 236, the user devices associated with the user 104, and/or the like. Examples of information included in the data structure are described below, which should not be construed as limiting.

In one exemplary aspect, the user 104 may configure/define in the data structure that the vehicle 102 should impede the shift from park mode when a first type of items (or items that are preferred by the user 104) are absent from the vehicle 102 when the user 104 enters the vehicle 102 and attempts to drive it. In some aspects, the first type of items may be, for example, the user's phone (e.g., the user device 106), the user's laptop, the user's tablet, and/or one or more user's tagged devices (e.g., devices with UWB or NFC tags), which may be pre-synced or registered with the vehicle 102. The user 104 may further define in the data structure that the user 104 may override the vehicle's "impede from park" feature in the absence of such devices when the user 104 tries to shift the vehicle 102 out of park mode in a second attempt. In alternative or additional aspects, the user 104 may define in the data structure that the user 104 may override the vehicle's "impede from park" feature in the absence of such devices when the user 104 provides a user override input to the vehicle 102.

In a second exemplary aspect, the user 104 may configure/define in the data structure that the vehicle 102 should not impede the shift from park mode when a second type of items (which may be different from the items that are preferred by the user 104 or the first type of items described above) are absent from the vehicle 102 when the user 104 enters the vehicle 102 and attempts to drive it. In some aspects, the second type of items may be, for example, the user's lunch, computer bag, gym bag, and/or the like. In this case, the vehicle 102 may not impede the shift from park mode when the user 104 enters the vehicle 102 without these items. In additional aspects, in this case, the user 104 may further define that the vehicle 102 may impede the shift from park mode when the second type of items are absent from the vehicle 102 and when the user 104/vehicle 102 is expected to travel to a predefined location (as determined via the historical vehicle/user travel pattern). For example, the user 104 may define that the vehicle 102 may impede the shift from park mode when the gym bag is absent from the vehicle 102 and the user 104 is expected to travel to the gym (and not otherwise). As another example, the user 104 may define that the vehicle 102 may impede the shift from park mode when a lunch or computer bag is absent from the vehicle 102 and the user 104 is expected to travel to the user's office (and not otherwise). In this case, the user 104 may additionally define in the data structure that the user 104 may override the vehicle's "impede from park" feature in the absence of such devices when the user 104 tries to shift the vehicle 102 out of park mode in a second attempt.

In a third exemplary aspect, the user 104 may define in the data structure that the vehicle 102 should impede the shift from park mode when a third type of items are present in the vehicle 102 when the user 104 enters the vehicle 102 and attempts to drive it. In some aspects, the third type of items may be those items that are different from a list of user's predefined authorized items. In this case, the user 104 may provide to the vehicle 102 the user's predefined authorized item list, and all items that are not included in this list may be construed as the "third type of items" by the vehicle 102. In some aspects, the third type of items may be items not belonging to the user 104 or the items that the user 104 is not authorized to have in the vehicle 102 with the user 104 (e.g., someone else's gun, medicine, etc.). The user 104 may further define in the data structure that the user 104 may override the vehicle's "impede from park" feature in this case when the user 104 tries to shift the vehicle 102 out of park mode in a second attempt and/or when the user 104 provides a user override input to the vehicle 102.

In a fourth exemplary aspect, the user 104 may define in the data structure that the vehicle 102 should impede the shift from park mode when the user 104 attempts to drive the vehicle 102 without completing the vehicle interior and/or exterior inspection. In this case, in some aspects, the user 104 may further define that the vehicle 102 should impede the shift from park mode when the user 104 attempts to drive the vehicle 102 without completing the vehicle inspection only at certain predefined times of the day (e.g., at 7 AM or 8 AM or start of the day), when the vehicle 102 is expected to travel for a distance (or duration) greater than a predefined distance threshold (e.g., greater than 100 miles), when the vehicle occupants or the vehicle driver has changed from a prior vehicle trip (e.g., when the vehicle 102 is a public transport vehicle), and/or the like. Similar to examples described above, the user 104 may further define in the data structure that the user 104 may override the vehicle's "impede from park" feature in this case when the user 104 tries to shift the vehicle 102 out of park mode in a second attempt and/or when the user 104 provides a user override input to the vehicle 102.

In a fifth exemplary aspect, the user 104 may define in the data structure that the vehicle 102 should impede the shift from park mode when the user 104 attempts to drive the vehicle 102 and when one or more conditions associated with vehicle parameters are met. For example, the user 104 may define in the data structure that the vehicle 102 should impede the shift from park mode when a vehicle tire pressure is less than a predefined threshold value, one or more vehicle doors are open when the user 104 attempts to shift the vehicle 102 out of park mode, one or more vehicle occupants and/or the user 104 are not buckled to their respective sitting areas, one or more predefined vehicle lights are switched off (e.g., when the user 104 or the fleet manager requires one or more vehicle lights to be switched on during vehicle movement), one or more objects are disposed unsecured on a vehicle top portion, one or more objects are disposed in proximity to a vehicle front portion or a vehicle rear portion, the user 104 is not wearing a predefined uniform (e.g., when the user 104 is required to wear a predefined uniform while driving the vehicle 102), a predefined object (e.g., sunglasses or a reflective object) is placed on a vehicle dash, and/or the like. Similar to examples described above, the user 104 may further define in the data structure that the user 104 may override the vehicle's "impede from park" feature in this case when the user 104 tries to shift the vehicle 102 out of park mode in a second attempt and/or when the user 104 provides a user override input to the vehicle 102.

In operation, the processor 240 may obtain inputs from the vehicle sensory system 230 and/or the transceivers described at a predefined frequency. The processor 240 may determine that the user 104 may have entered the vehicle 102 based on the inputs obtained from the vehicle sensory system 230. For example, the processor 240 may determine that the user 104 may have entered the vehicle 102 based on the inputs obtained from the vehicle's interior cameras, radar sensors, sitting area sensors, and/or the like.

Responsive to determining that the user 104 may have entered the vehicle 102, the processor 240 may fetch the data structure described above from the memory 242 and may determine whether a predefined condition is met based on the inputs obtained from the vehicle sensory system 230 and/or the transceivers and the fetched data structure. In some aspects, the processor 240 may determine that the predefined condition may be met when one or more conditions described above in the exemplary aspects are met. For example, the processor 240 may determine that the predefined condition may be met when one or more items are present in the vehicle 102 that do not match with the user's predefined authorized item list or one or more items that are preferred by the user 104 are absent from the vehicle 102. Specifically, the processor 240 may determine that the predefined condition may be met when one or more first type of items (as described above) may be absent from the vehicle 102, one or more third type of items may be present in the vehicle 102, the user 104 attempts to drive the vehicle 102 without completing the vehicle inspection, and/or when one or more conditions associated with vehicle parameters are met.

In this case, the processor 240 may first determine a type of item (or an item) that may be absent from or present in the vehicle 102 based on the inputs obtained from the vehicle sensory system 230 and/or the transceivers, when the processor 240 determines that the user 104 has entered the vehicle 102. For example, the processor 240 may determine that the first type of item may be absent from the vehicle 102 when the inputs obtained from the transceivers indicate that one or more of the user's phone (e.g., the user device 106), the user's laptop, the user's tablet, and/or one or more user's tagged devices are not communicatively coupled with the transceivers when the user 104 enters the vehicle 102. The processor 240 may determine that the predefined condition is met when the type of item (or the item) that is absent from the vehicle 102 is the same as the first type of item (or the items that are preferred by the user 104).

As another example, the processor 240 may determine that the second type of item (which is different from the first type of item described above, e.g., the user's lunch or gym bag) may be absent from the vehicle 102 when the inputs obtained from the vehicle sensory system 230 indicate that such items are not present in the vehicle 102 when the user 104 is inside the vehicle 102. In this case, the processor 240 may determine that the predefined condition is not met when the type of item that is absent from the vehicle 102 is the second type of item (unless the user 104/vehicle 102 is expected to travel to the predefined location, as described above). In some aspects, in this case, responsive to determining that the second type of item is absent from the vehicle 102, the processor 240 may determine whether the user 104/vehicle 102 is expected to travel to the predefined location as defined in the data structure based on the vehicle or user's historical travel pattern. The processor 240 may determine that the predefined condition is met when the vehicle or user's historical travel pattern indicates that the user 104/vehicle 102 is expected to travel to the predefined location and when the second type of item is absent from the vehicle 102. On the other hand, the processor 240 may determine that the predefined condition is not met when the vehicle or user's historical travel pattern indicates that the user 104/vehicle 102 is not expected to travel to the predefined location, even if the second type of item is absent from the vehicle 102.

In some aspects, the processor 240 may correlate the predefined location with the second type of item that is absent from the vehicle 102 to determine whether the predefined condition is met or not. For example, if the predefined location is the gym and the gym bag is absent from the vehicle 102 when the user 104 is inside the vehicle 102, the processor 240 may determine that the predefined condition is met. On the other hand, if the predefined location is the user's office and the gym bag is absent from the vehicle 102 when the user 104 is inside the vehicle 102, the processor 240 may determine that the predefined condition is not met. In this case (i.e., when the predefined location is the user's office), the processor 240 may determine that the predefined condition is met when, for example, the user's lunch or computer bag may be absent from the vehicle 102 when the user 104 is inside the vehicle 102.

As yet another example, the processor 240 may determine that the third type of item (which is different from the first type of item described above, e.g., the items not belonging to the user 104) or an item that does not match with the user's predefined authorized item list may be present in the vehicle 102 when the inputs obtained from the vehicle sensory system 230 indicate that such items are present in the vehicle 102 when the user 104 is inside the vehicle 102. For example, the processor 240 may determine that the third type of item may be present in the vehicle 102 when the inputs obtained from the vehicle's interior cameras, sensors, etc. indicate that someone else's gun, medicine, etc. is present in the vehicle 102 when the user 104 is inside the vehicle 102. The processor 240 may determine that the predefined condition is met when the third type of item may be present in the vehicle 102.

In further aspects, when the data structure indicates that the vehicle 102 should impede the shift from park mode when the user 104 attempts to drive the vehicle 102 without completing the vehicle interior and/or exterior inspection, the processor 240 may check whether the user 104 has completed the vehicle inspection based on the inputs obtained from the vehicle sensory system 230 when the user 104 is inside the vehicle 102. The processor 240 may determine that the predefined condition is met when the processor 240 determines that the user 104 has not completed the vehicle inspection when the user 104 is inside the vehicle 102, based on the inputs obtained from the vehicle sensory system 230 (e.g., the vehicle's interior and/or exterior cameras, sensors, user gestures or audio confirmation signals, etc.).

Figure 3:
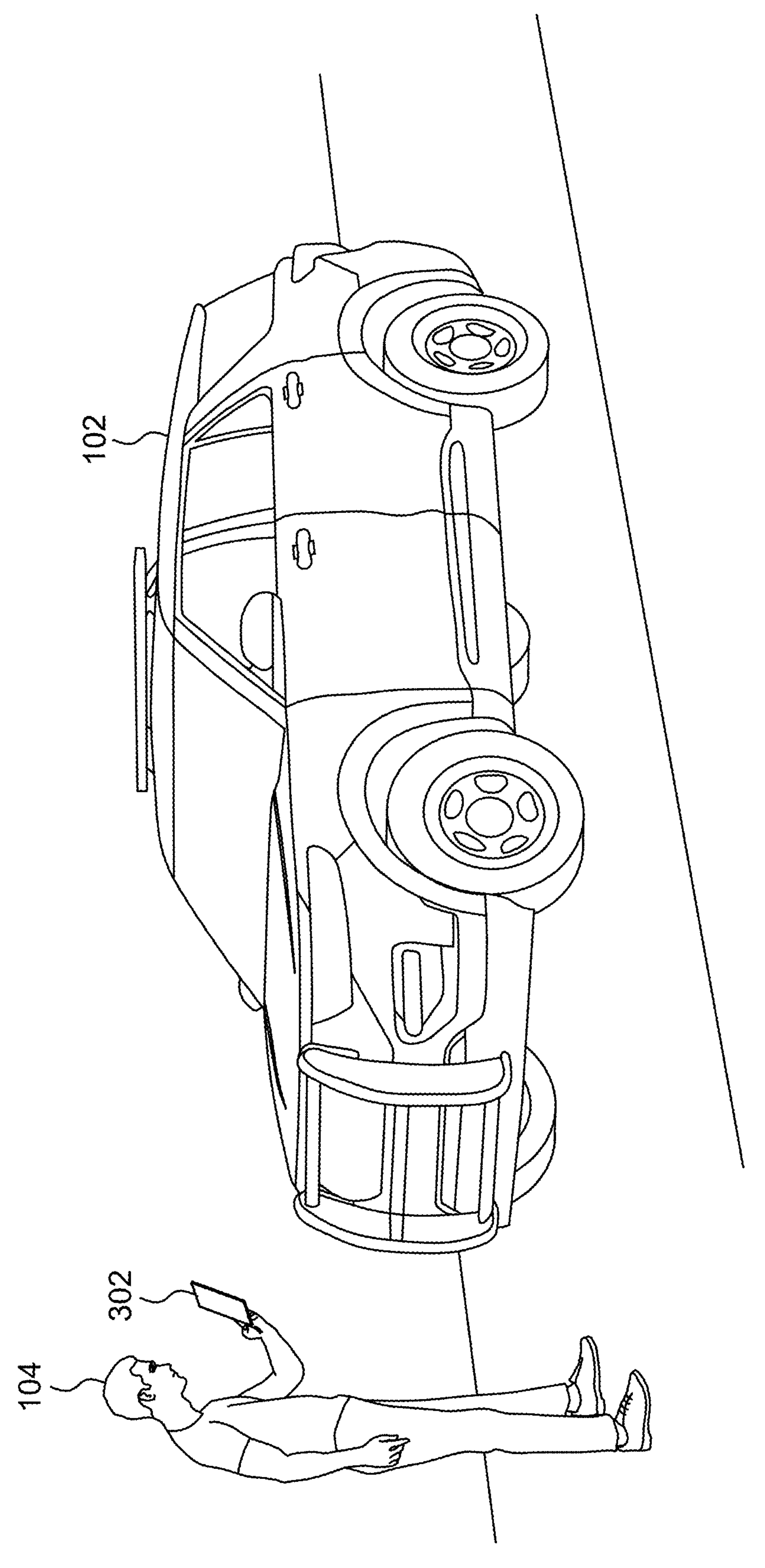
FIG. 3 depicts an example view of a user inspecting a vehicle in accordance with the present disclosure.

In some aspects, the vehicle inspection may include the user 104 walking around the vehicle 102, checking/inspecting the vehicle's exterior portion for any dents, ensuring the vehicle doors are locked, items are securely stored away, and/or the like. An exemplary view of the user 104 inspecting the vehicle 102 is depicted in FIG. 3. As shown in FIG. 3, the user 104 may provide the user's inputs for the vehicle inspection on a user device (shown as a tablet 302), which may transmit the inputs to the vehicle 102/processor 240. The processor 240 may determine that the user 104 may have completed the vehicle inspection when the processor 240 obtains the inputs from the tablet 302 and may determine that the user 104 may not have completed the vehicle inspection when the processor 240 does not obtain the inputs from the tablet 302.

In a similar manner, the vehicle inspection may include the user 104 checking/inspecting the vehicle's interior portion for any garbage, litter, etc. The processor 240 may determine that the user 104 may have completed the vehicle's interior inspection based on the inputs obtained from the vehicle's interior cameras. The vehicle inspection may further include an inspection of vehicle-trailer connections, pins, connectors, chains, etc. to ensure that these are firmly/correctly attached to the vehicle 102 any time before it is driven. The vehicle inspection may additionally include inspecting the vehicle occupants to ensure the passengers are in the correct places in the vehicle 102 and ready to travel (this may be helpful with handicapped passengers or kids).

In some aspects, the processor 240 may check for the vehicle inspection completion when one or more user-defined criteria included in the data structure are met. For example, the processor 240 may check for the vehicle inspection completion when a current time may be equivalent to the user-defined predefined times of the day included in the data structure (e.g., 7 AM or 8 AM or start of the day), when the vehicle 102 is expected to travel for a distance greater than a predefined distance threshold (e.g., greater than 100 miles), when the vehicle occupants or the vehicle driver has changed from a prior vehicle trip (e.g., when the vehicle 102 is a public transport vehicle), and/or the like. In other aspects, if the data structure indicates that the user 104/fleet manager desires the vehicle 102 to check for the vehicle inspection completion every time a driver starts a trip, the processor 240 may check for the vehicle inspection completion every time the user 104/driver enters the vehicle 102 and attempts to drive it.

In additional aspects, when the data structure indicates that the vehicle 102 should impede the shift from park mode when the user 104 attempts to drive the vehicle 102 and when one or more conditions associated with vehicle parameters are met, the processor 240 may check whether the conditions associated with the vehicle parameters are met. The processor 240 may determine that the predefined condition is met when the processor 240 determines that one or more conditions associated with the vehicle parameters are met.

Figure 4:
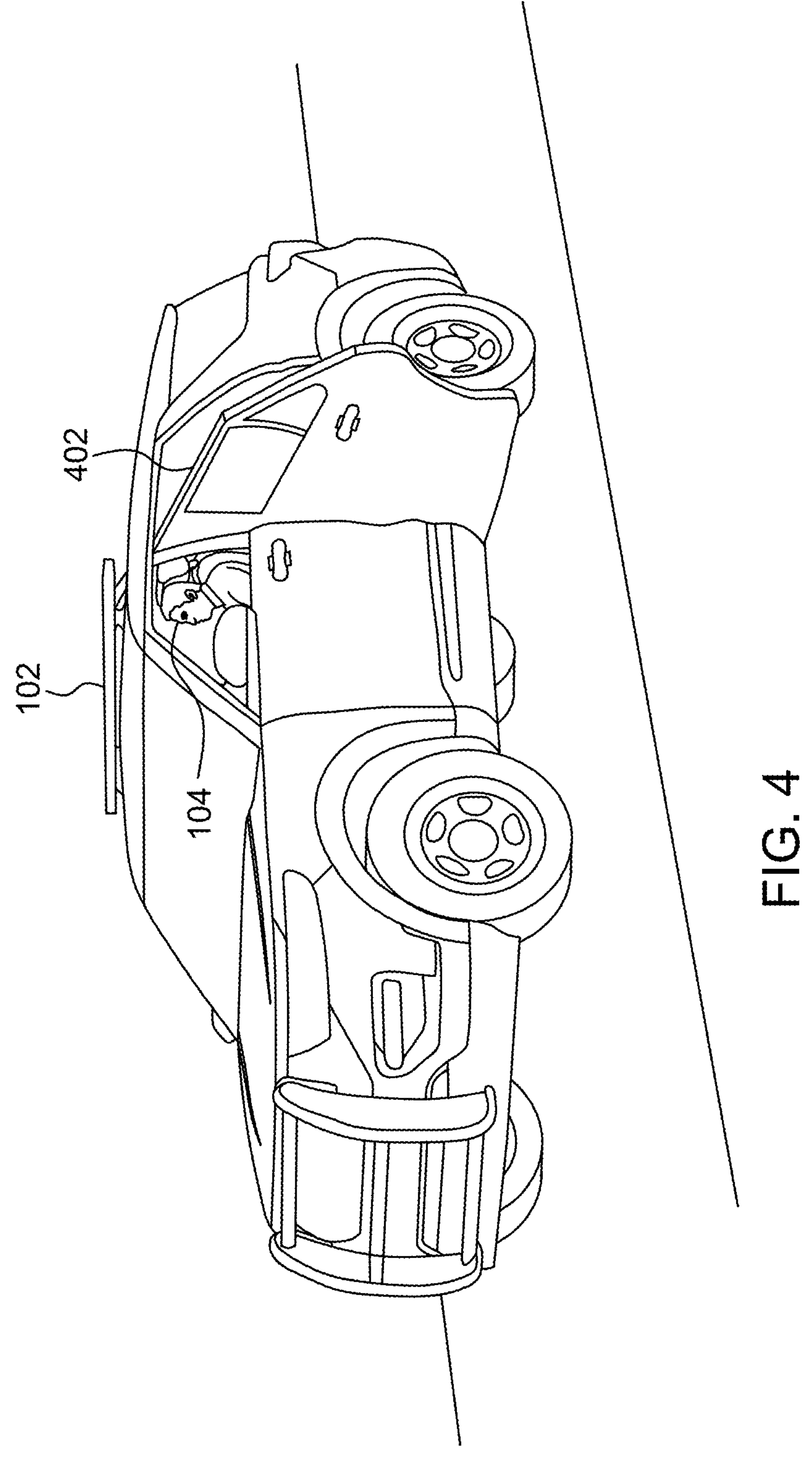
FIG. 4 depicts an example view of a vehicle with a rear door open in accordance with the present disclosure.

As described above, the conditions associated with the vehicle parameters may be met when a vehicle tire pressure is less than a predefined threshold value, one or more vehicle doors are open when the user 104 attempts to shift the vehicle 102 out of park mode, one or more vehicle occupants and/or the user 104 are not buckled to their respective sitting areas, one or more predefined vehicle lights are switched off (e.g., when the user 104 or the fleet manager requires one or more vehicle lights to be switched on during vehicle movement), one or more objects are disposed unsecured on a vehicle top portion, one or more objects are disposed in proximity to a vehicle front portion or a vehicle rear portion, the user 104 is not wearing a predefined uniform (e.g., when the user 104 is required to wear a predefined uniform while driving the vehicle 102), a predefined object (e.g., sunglasses or a reflective object) is placed on a vehicle dash, and/or the like. As an example, as shown in FIG. 4, the processor 240 may determine that a condition associated with the vehicle parameters is met (and hence the predefined condition is met) when a vehicle rear door 402 is open when the user 104 is inside the vehicle 102 and attempts to drive it.

Responsive to determining that the predefined condition is met in any of manners described above, the processor 240 may impede or disable the vehicle 102 from being shifted out of park mode. Stated another way, responsive to determining that the predefined condition is met, the processor 240 may prevent the user 104 from driving the vehicle 102. In further aspects, in addition to impeding the shift from park, the processor 240 may output, via the infotainment system 236, a notification (e.g., an audible or visual notification) indicating the reason for preventing the user 104 from shifting the vehicle 102 out of park mode. For example, the processor 240 may output a notification on the infotainment system 236 stating "The vehicle's rear door is open," "You may have forgotten your mobile phone," "You may want to carry your gym bag if you are going to the gym," and/or the like. In this manner, the vehicle 102/processor 240 may facilitate the user 104 in ensuring that the user 104 is carrying essential items and/or checking the vehicle's operating conditions before commencing a trip.

In some aspects, responsive to the processor 240 impeding the shift from the park mode and/or outputting the notification as described above, the user 104 may perform one or more override actions if the user 104 still desires to drive the vehicle 102 and/or when a predefined item (that may be of low importance for the user 104) may be absent from or present in the vehicle 102. In one exemplary aspect, the processor 240 may enable the user 104 to override the vehicle's "impede from park" feature when the user 104 tries to drive the vehicle 102 in a second attempt. In this case, the processor 240 may disable the vehicle 102 from being shifted out of park mode when the user 104 attempts to shift the vehicle 102 out of the park mode in a first attempt, and may enable the vehicle 102 to shift out of park mode when the user 104 attempts to shift the vehicle 102 out of the park mode in a second attempt.

In another exemplary aspect, the processor 240 may enable the user 104 to override the vehicle's "impede from park" feature when the user 104 provides a user override input to the vehicle 102/processor 240. In this case, the processor 240 may obtain the user override input from the user via the infotainment system 236, a user audio command, a user gesture command, and/or the like. Responsive to obtaining the user override input, the processor 240 may enable the user 104 to shift the vehicle 102 out of park mode.

In further aspects, the processor 240 may not impede or not disable the vehicle 102 from being shifted out of park mode when the processor 240 determines that none of the predefined conditions described above are met. In this case, the processor 240 may enable the user 104 to drive the vehicle 102 when the user 104 enters the vehicle 102.

The description above describes an aspect where the vehicle 102 impedes the shift from park mode when the predefined condition is met and the user 104 attempts to drive the vehicle 102; however, the present disclosure is not limited to such an aspect. It may be appreciated that if the vehicle 102 is an Autonomous Vehicle (AV), and the user 104 may not attempt to shift the vehicle 102 from the park mode himself/herself, but instead the vehicle's automated vehicle controller (AVC) may attempt to shift the vehicle 102 out of park mode. In this case, instead of checking that the user 104 is attempting to shift the vehicle 102 out of park mode, the vehicle 102 may check that the AVC is attempting to shift the vehicle 102 out of park mode.

In an exemplary aspect, in the case described above, responsive to determining that the AVC is attempting to shift the vehicle 102 out of park mode, the vehicle 102 may check if all the intended occupants (instead of the "items" described above) are present in the vehicle 102. For example, if two occupants (e.g., Occupant "A" and "B") should be present in the vehicle 102 when the vehicle 102 travels from a pick-up location (in this case, the vehicle 102 may be a taxi), the vehicle 102 may check if both the occupants "A" and "B" are present in the vehicle 102 when the AVC attempts to shift the vehicle 102 out of park mode at the pick-up location. The vehicle 102 may impede the shift from park if either of the occupants "A" or "B" is not present in the vehicle 102 when the AVC attempts to shift the vehicle 102 out of park.

As another example, if the occupant "A" is expected to exit the vehicle 102 at a drop-off location and the occupant "B" is expected to stay in the vehicle 102, the vehicle 102 may impede the AVC from shifting the vehicle 102 out of park mode when the vehicle 102 determines that both the occupants "A" and "B" are not present in the vehicle 102 at the drop-off location. In this case, the vehicle 102 may enable the AVC to shift the vehicle 102 out of park mode when the occupant "B" is present in (or returns to) the vehicle 102.

Figure 5:
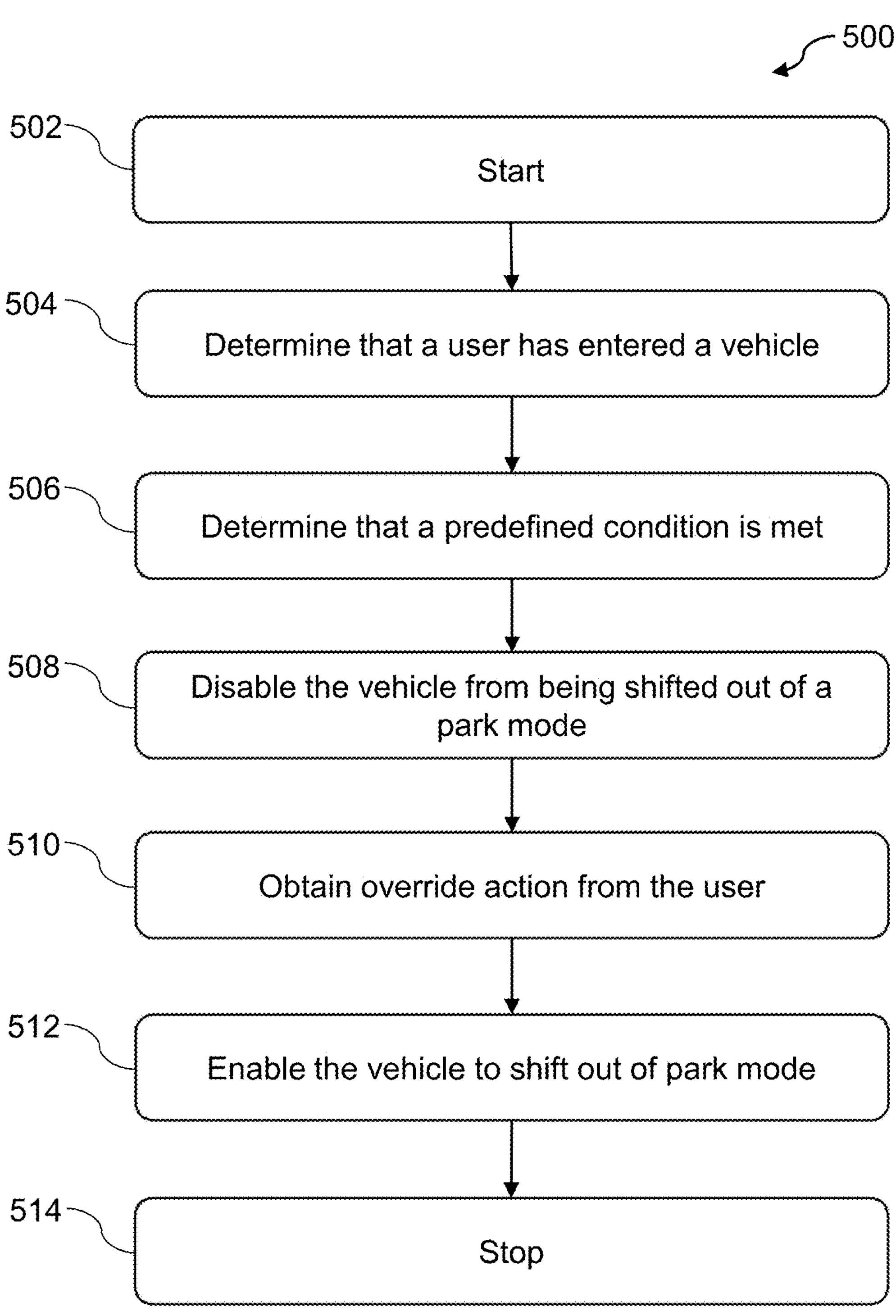
FIG. 5 depicts a flow diagram of an example method to impede a vehicle shift from park mode in accordance with the present disclosure.

FIG. 5 depicts a flow diagram of an example method 500 to impede a vehicle shift from park mode in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 240, that the user 104 has entered the vehicle 102 based on the inputs obtained from the vehicle sensory system 230. At step 506, the method 500 may include determining, by the processor 240, that the predefined condition is met based on the inputs obtained from the vehicle sensory system 230 and/or the TCU 224, responsive to determining that the user 104 has entered the vehicle 102. Examples of the predefined condition are described above in conjunction with FIG. 2. At step 508, the method 500 may include disabling, by the processor 240, the vehicle 102 from being shifted out of park mode, responsive to determining that the predefined condition is met.

At step 510, the method 500 may include obtaining, by the processor 240, one or more override actions from the user 104, as described above in conjunction with FIG. 2. At step 512, the method 500 may include enabling, by the processor 240, the vehicle 102 to shift out of park mode responsive to obtaining an override action from the user 104.

At step 514, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a sensor unit configured to detect a presence of a user and predetermined items in the vehicle that are not keys of the vehicle; and a processor configured to:

determine that the user has entered the vehicle based on inputs obtained from the sensor unit;

determine that a predefined condition is met based on the inputs obtained from the sensor unit responsive to determining that the user has entered the vehicle, wherein the predefined condition is met when one or more first items present in the vehicle do not match a user's predefined authorized item list or one or more second items that are preferred by the user are absent from the vehicle; and disable the vehicle from being shifted out of a park mode, responsive to determining that the predefined condition is met.

2. The vehicle of claim 1, wherein the processor is further configured to:

disable the vehicle from being shifted out of the park mode when the user attempts to shift the vehicle out of the park mode in a first attempt and when one of the one or more first items or the one or more second items is absent from or present in the vehicle; and enable the vehicle to shift out of the park mode when the user attempts to shift the vehicle out of the park mode in a second attempt and when the one of the one or more first items or the one or more second items is absent from or present in the vehicle.

3. The vehicle of claim 1, wherein the processor is further configured to:

obtain a user override input from the user responsive to determining that the predefined condition is met; and enable the vehicle to shift out of the park mode responsive to obtaining the user override input.

4. The vehicle of claim 3, wherein the processor obtains the user override input via at least one of a Human-Machine Interface (HMI), or a user audio command or a user gesture command.

5. The vehicle of claim 1, wherein the processor is further configured to:

determine an item that is absent from the vehicle when the user enters the vehicle based on the inputs obtained from the sensor unit;

determine that the item is same as the one or more second items; and disable the vehicle from being shifted out of the park mode responsive to determining that the item is same as the one or more second items.

6. The vehicle of claim 5, wherein the processor is further configured to:

determine that the item that was determined to be absent is not same as the one or more second items; and enable the vehicle to shift out of the park mode responsive to determining that the item that was determined to be absent is not same as the one or more second items.

7. The vehicle of claim 1, wherein the processor is further configured to:

determine an item that is present in the vehicle when the user enters the vehicle based on the inputs obtained from the sensor unit;

determine that the item is same as the one or more first items; and disable the vehicle from being shifted out of the park mode responsive to determining that the item is same as the one or more first items.

8. The vehicle of claim 1, wherein the one or more second items comprise at least one of a user's phone, a user's laptop, a user's tablet or a user's tagged device, and wherein the one or more first items comprise an item not belonging to the user.

9. The vehicle of claim 1, wherein the predefined condition is further met when a condition associated with a vehicle parameter is met.

10. The vehicle of claim 9, wherein the condition associated with the vehicle parameter is met when at least one: a vehicle tire pressure is less than a predefined threshold value, one or more vehicle doors are open, one or more vehicle occupants are not buckled, one or more predefined vehicle lights are switched off, one or more objects are disposed unsecured on a vehicle top portion, one or more objects are disposed in proximity to a vehicle front portion or a vehicle rear portion, the user is not wearing a predefined uniform, or a predefined object is placed on a vehicle dash.

11. The vehicle of claim 1, wherein the processor is further configured to:

determine that the user has not completed a vehicle inspection based on the inputs obtained from the sensor unit, responsive to determining that the user has entered the vehicle; and determine that the predefined condition is met when the user has not completed the vehicle inspection.

12. The vehicle of claim 11, wherein the vehicle inspection comprises at least one of: an inspection of a vehicle exterior portion, an inspection of a vehicle interior portion, an inspection of a vehicle-trailer connection, or an inspection of vehicle occupants.

13. The vehicle of claim 11, wherein the processor determines that the user has not completed the vehicle inspection when at least one of:

a current time is equivalent to a predefined time of day, the vehicle is expected to travel for a distance greater than a predefined distance threshold, or vehicle occupants or a vehicle driver has changed from a prior vehicle trip.

14. The vehicle of claim 1, wherein the processor is further configured to:

determine that the user is expected to travel to a predefined location based on a user's historical travel pattern; and determine that the predefined condition is met responsive to determining that the user is expected to travel to the predefined location.

15. A method comprising:

determining, by a processor, that a user has entered a vehicle based on inputs obtained from a sensor unit configured to detect a presence of the user and predetermined items in the vehicle that are not keys of the vehicle;

determining, by the processor, that a predefined condition is met based on the inputs obtained from the sensor unit responsive to determining that the user has entered the vehicle, wherein the predefined condition is met when one or more first items present in the vehicle do not match a user's predefined authorized item list or one or more second items that are preferred by the user are absent from the vehicle; and disabling, by the processor, the vehicle from being shifted out of a park mode, responsive to determining that the predefined condition is met.

16. The method of claim 15 further comprising:

disabling the vehicle from being shifted out of the park mode when the user attempts to shift the vehicle out of the park mode in a first attempt and when a predefined item is absent from or present in the vehicle; and enabling the vehicle to shift out of the park mode when the user attempts to shift the vehicle out of the park mode in a second attempt and when the predefined item is absent from or present in the vehicle.

17. The method of claim 15 further comprising:

obtaining a user override input from the user responsive to determining that the predefined condition is met; and enabling the vehicle to shift out of the park mode responsive to obtaining the user override input.

18. The method of claim 15 further comprising:

determining an item that is absent from the vehicle when the user enters the vehicle based on the inputs obtained from the sensor unit;

determining that the item is same as the one or more second items; and disabling the vehicle from being shifted out of the park mode responsive to determining that the item is same as the one or more second items.

19. The method of claim 18 further comprising:

determining that the item that was determined to be absent is not same as the one or more second items; and enabling the vehicle to shift out of the park mode responsive to determining that the item that was determined to be absent is not same as the one or more second items.

20. A vehicle comprising:

a sensor unit configured to detect a presence of a user and predetermined items in the vehicle; and a processor configured to:

determine that the user has entered the vehicle based on inputs obtained from the sensor unit, wherein the vehicle is authenticated by a key that is not a phone;

determine that a predefined condition is met based on the inputs obtained from the sensor unit responsive to determining that the user has entered the vehicle, wherein the predefined condition is met when a user's phone that is also configured as a key of the vehicle is absent from the vehicle; and disable the vehicle from being shifted out of a park mode, responsive to determining that the predefined condition is met.

* * * * *